(12) United States Patent
Montagne

(10) Patent No.: US 10,368,414 B2
(45) Date of Patent: Jul. 30, 2019

(54) DETERMINING THE POSITION OF A PORTABLE DEVICE RELATIVE TO A LUMINAIRE

(71) Applicant: SIGNIFY HOLDING B.V., Eindhoven (NL)

(72) Inventor: Louis-Xavier Marie Montagne, Lyons (FR)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/577,071

(22) PCT Filed: May 12, 2016

(86) PCT No.: PCT/EP2016/060685
§ 371 (c)(1),
(2) Date: Nov. 27, 2017

(87) PCT Pub. No.: WO2016/188760
PCT Pub. Date: Dec. 1, 2016

(65) Prior Publication Data
US 2018/0235049 A1      Aug. 16, 2018

(30) Foreign Application Priority Data

May 26, 2015   (EP) ..................................... 15305790

(51) Int. Cl.
*H05B 33/08*   (2006.01)
*G01C 21/20*   (2006.01)
(Continued)

(52) U.S. Cl.
CPC ........... *H05B 33/0854* (2013.01); *F21V 9/08* (2013.01); *G01C 21/206* (2013.01);
(Continued)

(58) Field of Classification Search
None
See application file for complete search history.

(56) References Cited

U.S. PATENT DOCUMENTS

| 8,469,547 B2 | 6/2013 | Paolini |
| 2003/0128355 A1* | 7/2003 | Perkins ..................... G01S 1/70 356/121 |

(Continued)

FOREIGN PATENT DOCUMENTS

| EP | 2280335 A2 | 2/2011 |
| JP | 2012026791 A | 2/2012 |

(Continued)

*Primary Examiner* — Douglas W Owens
*Assistant Examiner* — Jianzi Chen
(74) *Attorney, Agent, or Firm* — Akarsh P. Belagodu

(57) ABSTRACT

A system for determining the position of a portable device (501) relative to a luminaire (100, 503) is disclosed. The system comprises at least one luminaire (100, 503) that comprises at least two light emitters (101A, 101B) for emitting light that comprises a light signature identifying the light emitter from which the light is originated. The system further comprises an optical system (102) that creates a position specific distribution (103) of the light emitted by the two light emitters (101A, 101B). This light can be sensed by a portable device (501) comprising a sensor for sensing light, a memory for storing distribution information indicative of the distribution of the light emitted via the optical system (102) and a processor coupled to the light sensor for receiving data on the sensed light and coupled to the memory to get access to the information stored in the memory. The processor is arranged to determine the position of the portable device (501) relative to the luminaire (100, 503) on the basis of light sensed and the distribution information (103). Using the relative position, the absolute (Continued)

position of the portable device (501) in a space can be determined by using information on the position of the luminaire in said space.

14 Claims, 13 Drawing Sheets

(51) Int. Cl.
    *G01S 1/70*     (2006.01)
    *G01S 5/16*     (2006.01)
    *F21V 9/08*     (2018.01)
    *G01J 3/28*     (2006.01)
    *H04B 10/116*     (2013.01)
    *H04B 10/548*     (2013.01)
    *H04N 5/225*     (2006.01)

(52) U.S. Cl.
    CPC ............... *G01J 3/2803* (2013.01); *G01S 1/70* (2013.01); *G01S 5/16* (2013.01); *H04B 10/116* (2013.01); *H04B 10/548* (2013.01); *H04N 5/2256* (2013.01); *H05B 33/0851* (2013.01); *H05B 33/0866* (2013.01)

(56) References Cited

U.S. PATENT DOCUMENTS

| | | |
|---|---|---|
| 2012/0170939 A1 | 7/2012 | Schenk et al. |
| 2012/0235579 A1 | 9/2012 | Chemel et al. |
| 2014/0046624 A1 | 2/2014 | Miettinen |
| 2014/0084050 A1 | 3/2014 | Calvarese et al. |
| 2014/0280316 A1 | 9/2014 | Ganick et al. |
| 2014/0285818 A1 | 9/2014 | Holz |
| 2014/0314420 A1 | 10/2014 | De Bruijn et al. |
| 2016/0338174 A1* | 11/2016 | Aliakseyeu ........ H05B 37/0218 |

FOREIGN PATENT DOCUMENTS

| | | |
|---|---|---|
| WO | 2013153476 A1 | 10/2013 |
| WO | 2014181205 A2 | 11/2014 |

\* cited by examiner

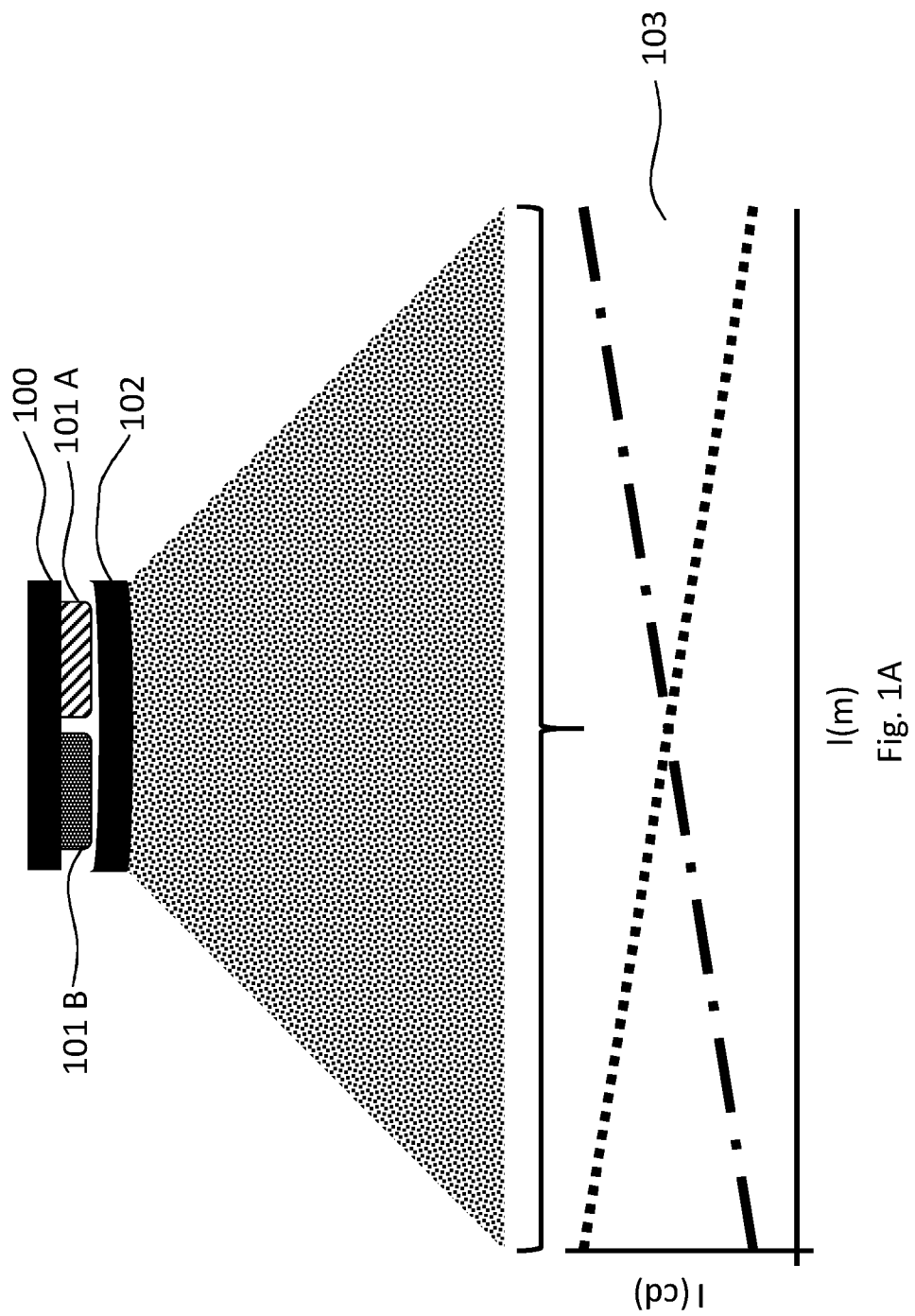

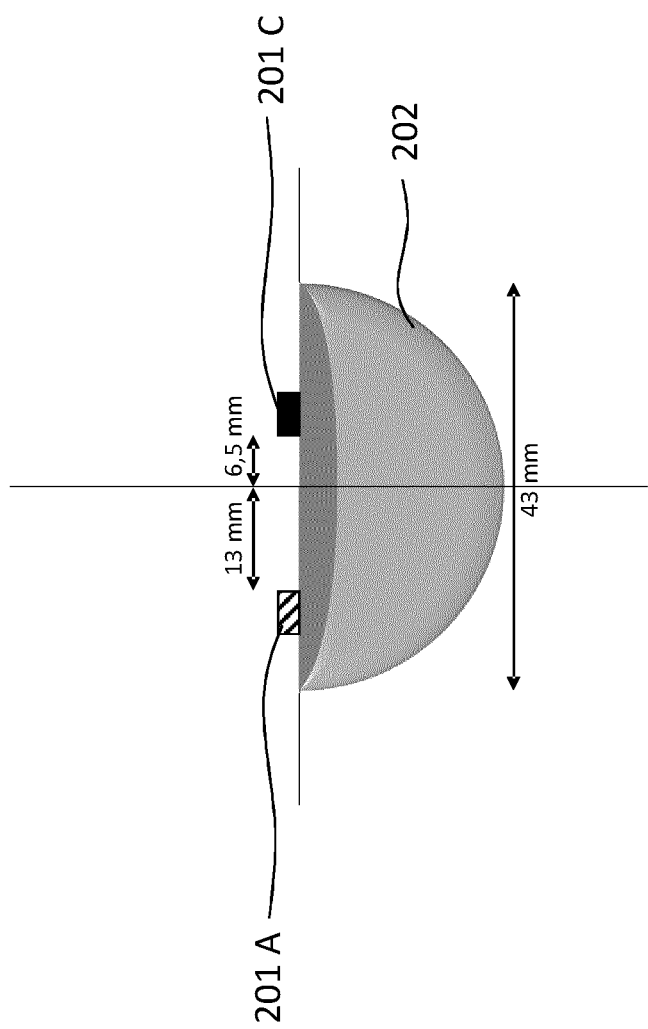

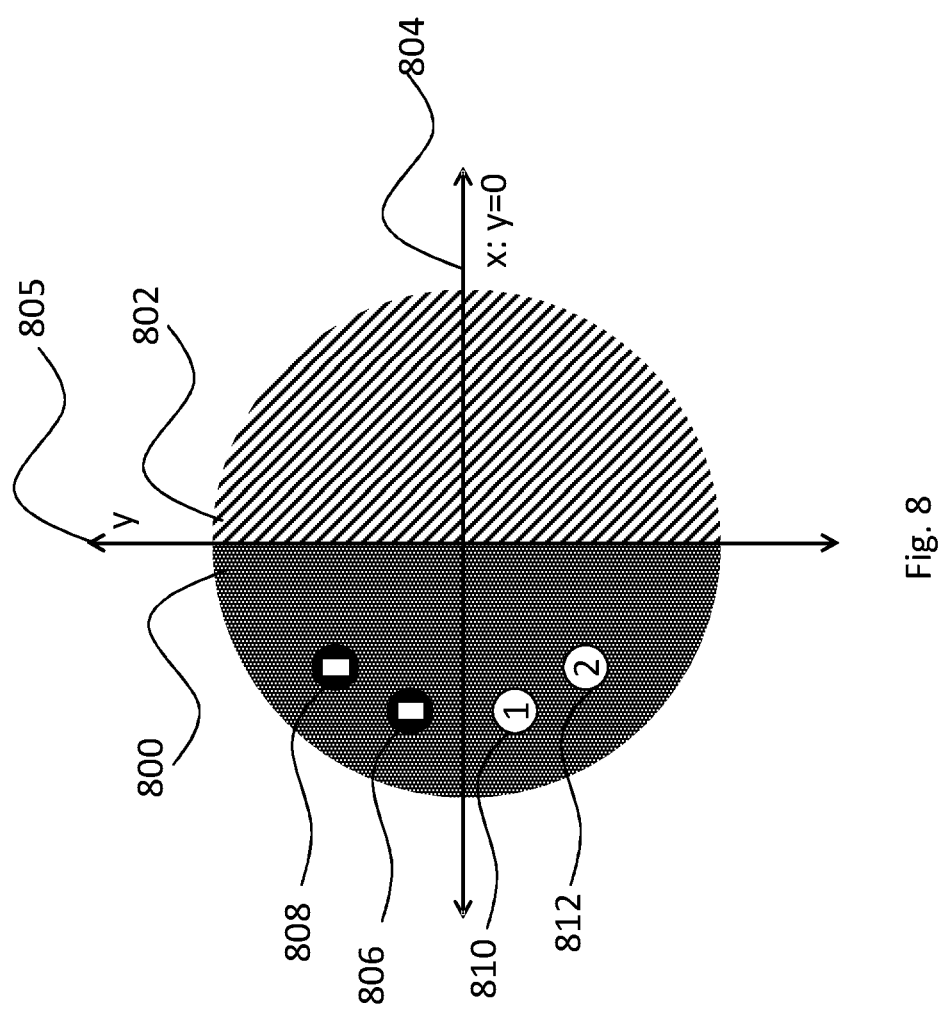

DETERMINING THE POSITION OF A PORTABLE DEVICE RELATIVE TO A LUMINAIRE

CROSS-REFERENCE TO PRIOR APPLICATIONS

This application is the U.S. National Phase application under 35 U.S.C. § 371 of International Application No. PCT/EP2016/060685, filed on May 12, 2016, which claims the benefit of European Patent Application No. 15305790.6, filed on May 26, 2015. These applications are hereby incorporated by reference herein.

FIELD OF THE INVENTION

The present invention generally relates to a system and method for determining a position of a portable device relative to a luminaire. The invention further relates to a luminaire and portable device for use in the system and a computer program product enabling a processor to carry out the method.

BACKGROUND

Indoor positioning services refer to methods where networks of devices and algorithms are used to locate mobile devices within buildings. Indoor positioning is regarded as a key component of location-aware mobile computing and is an important element in providing augmented reality (AR) services. Location aware computing refers to applications that utilize a user's location to provide content relevant to that location. AR is a technology that overlays a virtual space onto a real (physical) space. To successfully enable AR and location aware computing, accurate indoor positioning is an important requirement.

The Global Positioning System (GPS) loses significant power when it is used indoor as most construction materials shield the satellite signals necessary for positioning by GPS. Additionally, when indoors, GPS suffers from multi-path propagation effects. Alternative solutions for indoor positioning have been sought such as techniques based on received signal strength indication (RSSI) from Wi-Fi and Bluetooth wireless access points, Ultrasonic techniques (US) and optical indoor positioning techniques.

The accuracy of positioning systems based on RSSI is limited as indoor environments cause radio waves to propagate in dynamic and unpredictable ways. Ultrasonic techniques (US) transmit acoustic waves to microphones and operate at lower frequencies than systems based on RSSI from Wi-Fi and Bluetooth. Therefore, signals attenuate significantly when passing through walls which potentially makes US techniques more accurate than systems based on RSSI as signals of adjacent rooms will not interfere.

Optical indoor positioning techniques use optical signals, either visible or infrared, to accurately locate mobile devices indoors. These can be more accurate than the other approaches mentioned, since optical signals are highly directional and typically cannot penetrate solid objects. However, this directionality limits the potential reliability of optical signals, since difficulties in aligning the receiver and transmitter can occur. Conventional optical indoor positioning techniques need, among other things, at least three luminaires in their field of view to work accurately. An example of such an optical indoor positioning technique is discussed in patent application US20140280316.

Thus, there is a need for an optical indoor positioning technique that eliminates the need for careful alignment between receiver and transmitters.

SUMMARY OF THE INVENTION

It is an object of the invention to provide a system, and a method, which enables a portable device to determine its position when it is used indoor.

According to a first aspect of the invention the object is achieved by a system for determining a position of a portable device relative to a luminaire, comprising:

at least one luminaire comprising at least two light emitters for emitting light, the light comprising a light signature identifying the light emitter from which the light is originated;

an optical system for guiding the emitted light to create a position specific distribution of the light emitted by the at least two light emitters via the optical system, wherein the distribution of light is unique for every position in a two-dimensional space or three dimensional space;

and a portable device comprising:
a sensor for sensing light;
a memory for storing distribution information indicative of the distribution of the light emitted via the optical system;
and a processor coupled to the light sensor for receiving data on the sensed light and coupled to the memory to get access to the information stored in the memory, said processor is arranged to:
derive the light signatures from the received data on the sensed light;
determine contribution information indicative for contributions of light with the derived signatures to the light sensed
and determine a position of the portable device relative to the luminaire on the basis of contribution information and the distribution information.

The system can be implemented in many indoor facilities such as, but not limited to, retail facilities, office and government buildings, recreational indoor areas, hotels and restaurants. An advantage of this system is that the position of a portable device can be determined according to the signal originating from only one luminaire. Therefore, the portable device only needs to have only one luminaire in the field of view of its sensor for sensing the light. This makes the technique more reliable than techniques relying on multiple luminaires in the field of view of the sensor as it eliminates the need for careful alignment between transmitter and receiver. Moreover, the suggested system is advantageous in, for example, corners of indoor areas, where it is not possible to have multiple luminaires, as well as in areas where there are glare limitations in some directions.

In an embodiment of the system, the portable device further comprises a module for connecting the processor to a network to retrieve information from the network.

This is beneficial as information does not have to be stored on the portable device. A useful feature as portable devices can be used in many different indoor locations. For every location, the portable device can then retrieve the information necessary for position determination without clogging its memory with this information.

In some embodiments of the system, the sensor for sensing light is an image sensor and wherein the portable device further comprises at least one sensor of a group comprising an accelerometer providing data on acceleration of the portable device, a gyroscope for providing data on the rotation of the portable device and a magnetic field sensor providing data on the orientation of the portable device, wherein the processor is coupled to the at least one sensor for receiving data provided by the at least one sensor and wherein the processor is configured to use the data received in combination with the contribution information and the distribution information to determine the position of the portable device relative to the luminaire.

Taking this additional information into account is helpful as the accuracy of the position determined increases. The information originating from the mentioned sensors is available in many portable devices such as, but not limited to, smart phones, tables and smart wearable devices.

In some embodiments of the system, the processor is arranged to retrieve information on a position of the luminaire in a space and the processor is configured to use this information to determine the position of the portable device in the space.

For location based services as well as for navigational services it is necessary to know the absolute position of a portable device in a space illustrating the usefulness of the above embodiment.

In some embodiments of the system, the system comprises multiple luminaires in the space having multiple possible configurations of light emitters, the processor is arranged to retrieve information on the possible configurations of light emitters within the luminaires, the processor is configured to use the contribution information and the information on possible configurations of light emitters within the luminaires to determine the configuration of the light emitters within the luminaire from which the sensed light originates and the processor is configured to retrieve the distribution information of the light emitted by a luminaire with the determined configuration.

Since the possibility of having luminaires with different configurations of light emitters in the same space exists, it is important that a portable device is aware of the configuration of light emitters within the luminaire of which the light the portable device senses originates. In this way, the portable device is able to determine the correct position. Therefore, the above embodiment is advantageous.

In some embodiments of the system, the luminaire comprises more than two light emitters.

This is propitious as the position in three dimensions can now be determined solely from the light sensed without the need for information from additional sensors or luminaires.

In some embodiments of the system, the processor controls the sensor to determine a spectrum for which the sensor senses the light.

This embodiment is useful in indoor areas where there is an abundance of light originating from other light sources such as, but not limited to, the sun. When there is too much light originating from light sources other than the luminaire, the sensor for sensing light might not be able to distinguish the light originating from the luminaire. By, for example, only observing parts of the spectrum up to 450 nm the appearance of light originating from the sun will decrease and the light originating from the luminaire can be detected by the sensor for sensing light.

According to a second aspect of the present invention the object is achieved by a luminaire that comprises at least two light emitters for emitting light, the light comprising a light signature identifying the light emitter from which the light originates and the light being emitted towards an optical system for guiding the emitted light to create a position specific distribution of the light emitted by the two light emitters via the optical system.

In an embodiment, the light emitters comprise electronics that control a light source to define the light signatures identifying the light emitters.

This is an advantageous embodiment as the light signatures can be independent from the light sources which is useful when light sources are replaced.

In an embodiment, the electronics control the light source to create a temporal modulation and the control is configured to prevent interference effects between light signatures originating from different light emitters in the luminaire.

It is important that the sensor for sensing light can distinguish between the different signatures originating from the luminaire via the optical system. Therefore, a control that prevents interference effects is advantageous. Additionally, a temporal modulation is beneficial as this can be arranged in such a way that it is not visible to the human eye while being identifiable for a sensor for sensing light.

In an embodiment, the electronics control the spectral properties of the light sources.

This is beneficial as spectral properties can be an additional distinction between different signals. Therefore the signatures can be more distinguishable for the sensor for sensing light.

According to a third aspect of the present invention the object is achieved by a portable device for determining a position relative to a luminaire, which luminaire comprises two light emitters for emitting light that comprises a light signature identifying the light emitter from which the light is originated, which light is emitted towards an optical system for guiding the emitted light to create a position specific distribution of the light emitted by the two light emitters via the optical system comprising:

a sensor for sensing light;
a memory for storing distribution information indicative of the distribution of the light emitted via the optical system;
and a processor coupled to the light sensor for receiving data on the sensed light and coupled to the memory to get access to the information stored in the memory, said processor is arranged to:
derive the light signatures from the received data on the sensed light;
determine contribution information indicative for contributions of light with the derived signatures to the light sensed
and determine a position of the portable device relative to the luminaire on the basis of contribution information and the distribution information.

According to a fourth aspect of the present invention the object is achieved by a method of determining a position of a portable device relative to a luminaire, which luminaire comprises two light emitters for emitting light that comprises a light signature identifying the light emitter from which the light is originated, which light is emitted towards an optical system for guiding the emitted light to create a position specific distribution of the light emitted by the two light emitters via the optical system, which light is sensed by a sensor for sensing light within the portable device; the method comprising:

receiving data on the sensed light;
receiving distribution information indicative of the distribution of the light emitted via the optical system;
deriving the light signatures from the received data on the sensed light;

determining contribution information indicative for contributions of light with the derived signatures to the light sensed
and determining a position of the portable device relative to the luminaire on the basis of contribution information and the distribution information.

In an embodiment wherein the sensor for sensing light is an image sensor and sensor and wherein the portable device further comprises at least one sensor of a group comprising an accelerometer providing data on acceleration of the portable device, a gyroscope for providing data on the rotation of the portable device and a magnetic field sensor providing data on the orientation of the portable device, the method further comprises:

receiving data provided by the at least one sensor;
combining this data with the contribution information and the distribution information;
and determining the position of the portable device relative to the luminaire on the basis of the combination of the received data, the contribution information and the distribution information.

According to a fifth aspect of the present invention the object is achieved by a computer program product. The computer program product comprises computer program code to perform any method according to the invention or the functionality of any one of the above-mentioned embodiments when the computer program product is run on a processing unit of a computing device, for example on the processing unit of the portable device.

BRIEF DESCRIPTION OF THE DRAWINGS

The above, as well as additional objects, features and advantages of the disclosed system, luminaire, portable device, method and computer program product, will be better understood through the following illustrative and non-limiting detailed description of embodiments of devices and methods, with reference to the appended drawings FIG. 1 to 8.

FIG. 1A schematically shows an embodiment of a luminaire according to the invention comprising two light emitters that emit light comprising a light signature identifying the light emitter from which the light originates. It schematically shows that the light emitted by the two light emitters is mixed by an optical system to create a position specific distribution of the light emitted by the two light emitters via the optical system.

FIG. 2A-E schematically show embodiments of the optical element with two and three light emitters.

FIG. 8 schematically shows an embodiment where the relative position to a luminaire in three dimensions is generated from a luminaire comprising two light emitters.

All the figures are schematic, not necessarily to scale, and generally only show parts which are necessary in order to elucidate the invention, wherein other parts may be omitted or merely suggested.

DESCRIPTION

The present invention generally relates to a system and method for determining a position of a portable device relative to a luminaire accurately and reliably. The invention further relates to a luminaire and portable device for use in the system and a computer program product enabling a processor to carry out the method.

FIG. 1A illustrates a luminaire 100 comprising at least two light emitters 101 A-B for emitting light. The light comprising a light signature identifying the light emitter from which the light originates. The signatures of the different light emitters are different as illustrated in FIG. 1A. by the different hatching of light emitter 101A and light emitter 101B. The light is emitted towards an optical system 102 for guiding the emitted light to create a position specific distribution 103 of the light emitted by the two light emitters via the optical system. Note that distribution 103 is position specific in a two-dimensional space. The two-dimensional space, as shown in FIG. 1, is defined as the plane perpendicular to the floor plane.

Figure 2A:
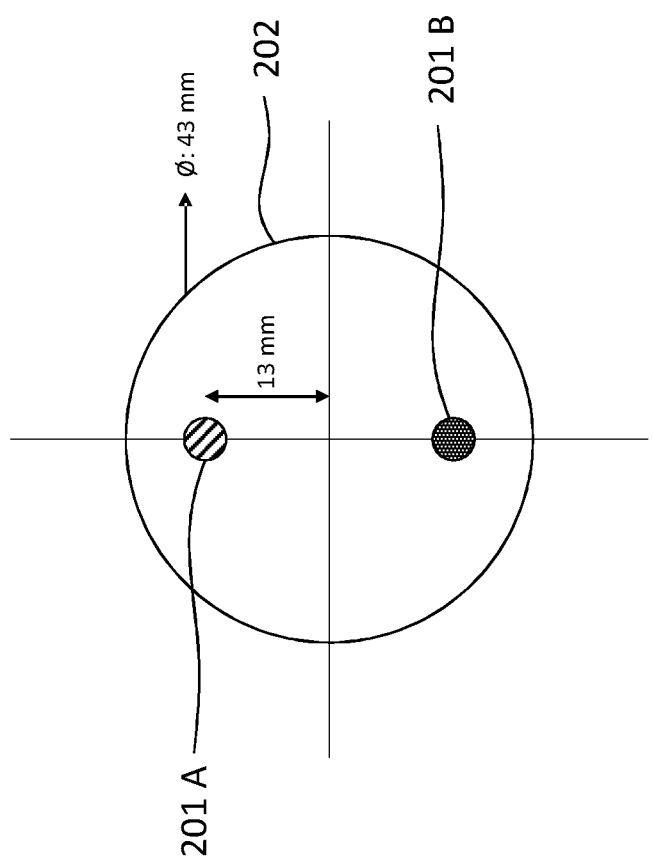
Figure 2B:
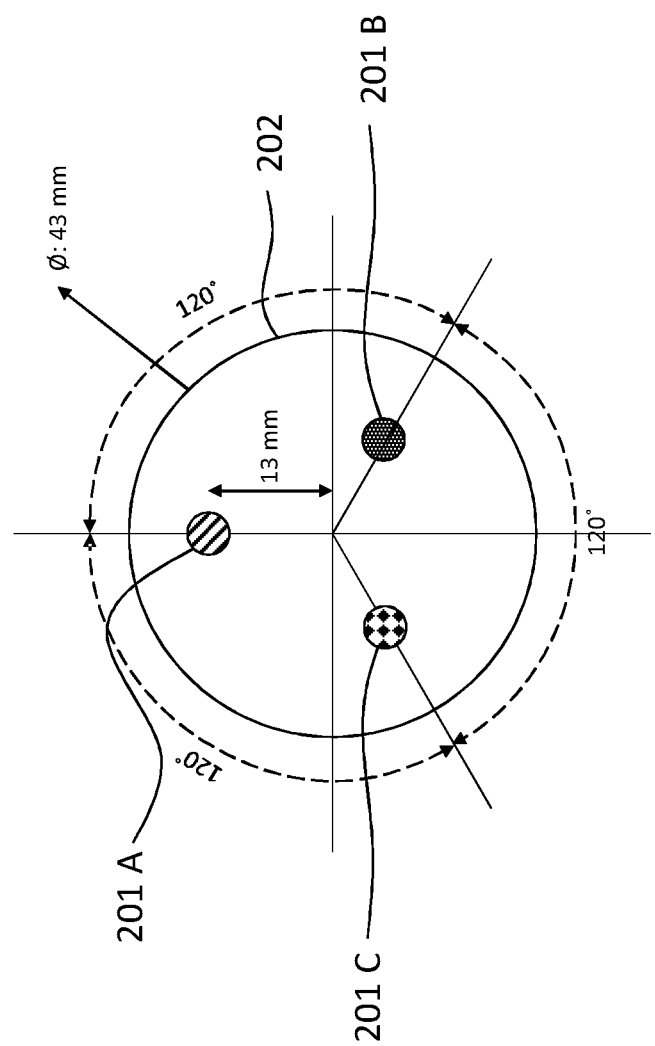
Figure 2C:
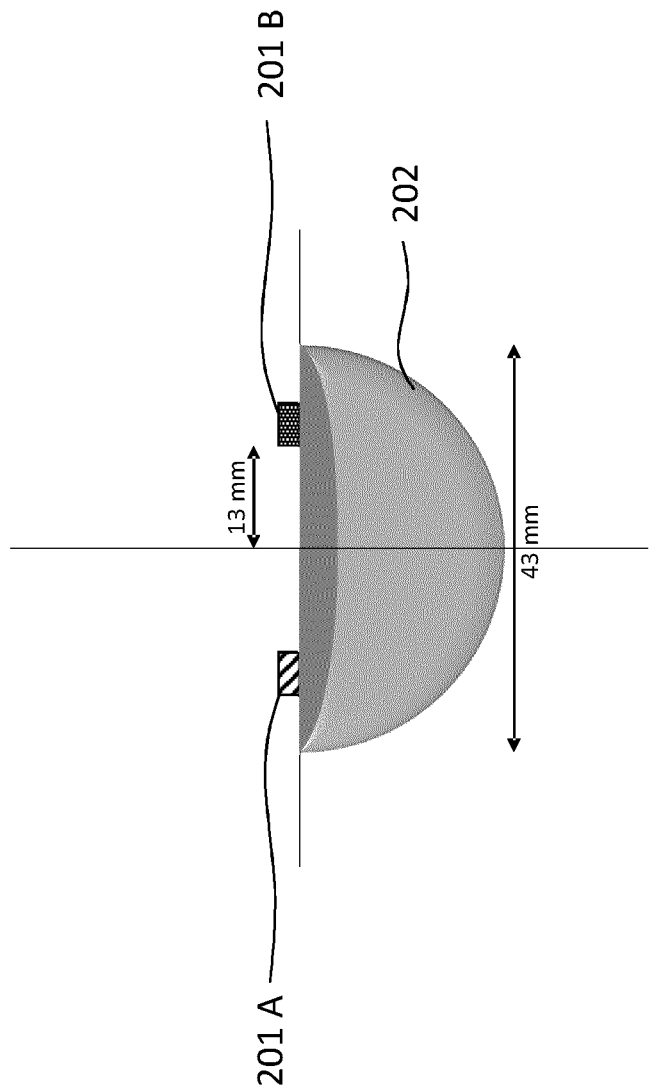

The optical system 102 can be any combination of optical elements that mixes the light signatures emitted by the light emitters 101A-B in such a way that the ratio between light signatures originating from the light emitters 101A-B, when the light is incident on a flat surface such as the surface of the sensor for sensing light, is unique for every position in a two-dimensional space. One example of such an optical system is shown in FIGS. 2A and 2C. In FIG. 2A, the top view of a transparent meniscus shaped lens 202 with a refractive index of 1.58 and a diameter of 42 mm is shown. Two light emitters 201A-B are placed on the same line 13 mm from the center of the lens and emit light towards the lens 202. FIG. 2C shows the side view of said lens 202 and the light emitters 201A-B. When using only two light emitters, it is difficult to create a distribution that is position specific for a three-dimensional space as symmetries can occur.

Figure 2D:
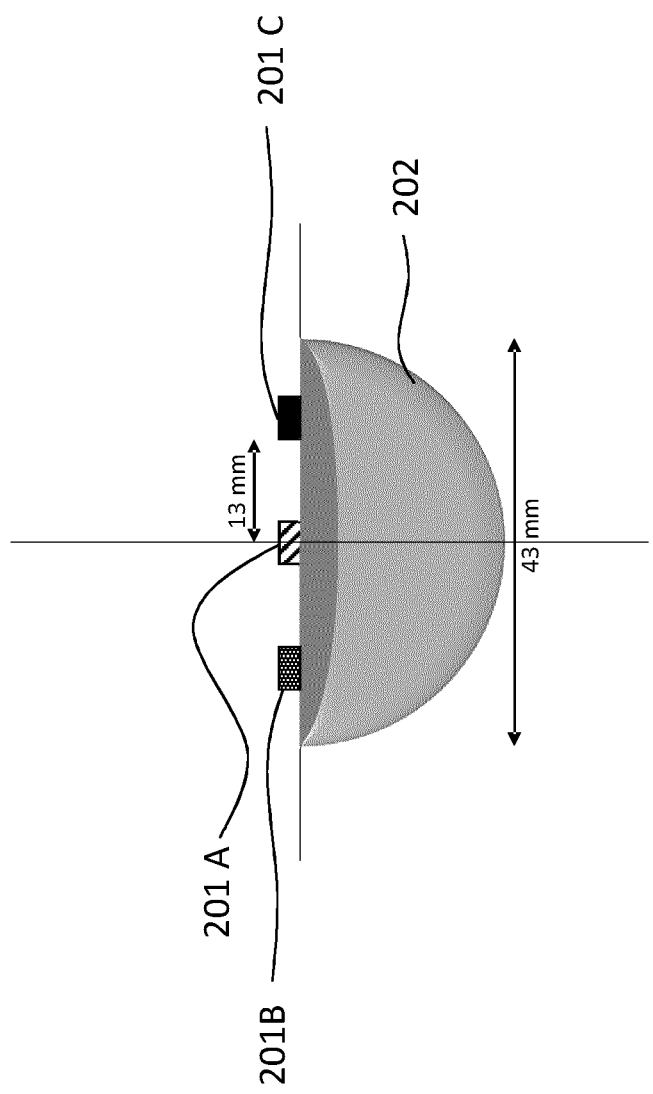

Therefore, it is also possible to have an optical system comprising three light emitters. In this case, the distribution can be made specific for every position in a three dimensional space with direct line of sight to the luminaire. An example of such a system is shown in FIGS. 2B, 2D and 2E. FIG. 2B shows the top view of a transparent meniscus shaped lens 202 with a refractive index of 1.58 and a diameter of 42 mm. Three light emitters 201A-C are placed 13 mm from the center of the lens. The angles between the lines on which the light emitters are placed are 120°. FIG. 2D shows a front view of the lens 202 with light emitters 201A-C and FIG. 2E shows a side view of the lens 202. Now, only light emitters 201A and 201C are visible.

The ratio between light signatures can be the ratio between the respective irradiance ($W/m^2$), spectral irradiance ($W/(m^2\ Hz)$), radiant intensity ($W/sr$), spectral intensity ($W/(sr\ Hz)$) and luminous intensity (Cd) of the light emitters.

Figure 1B:
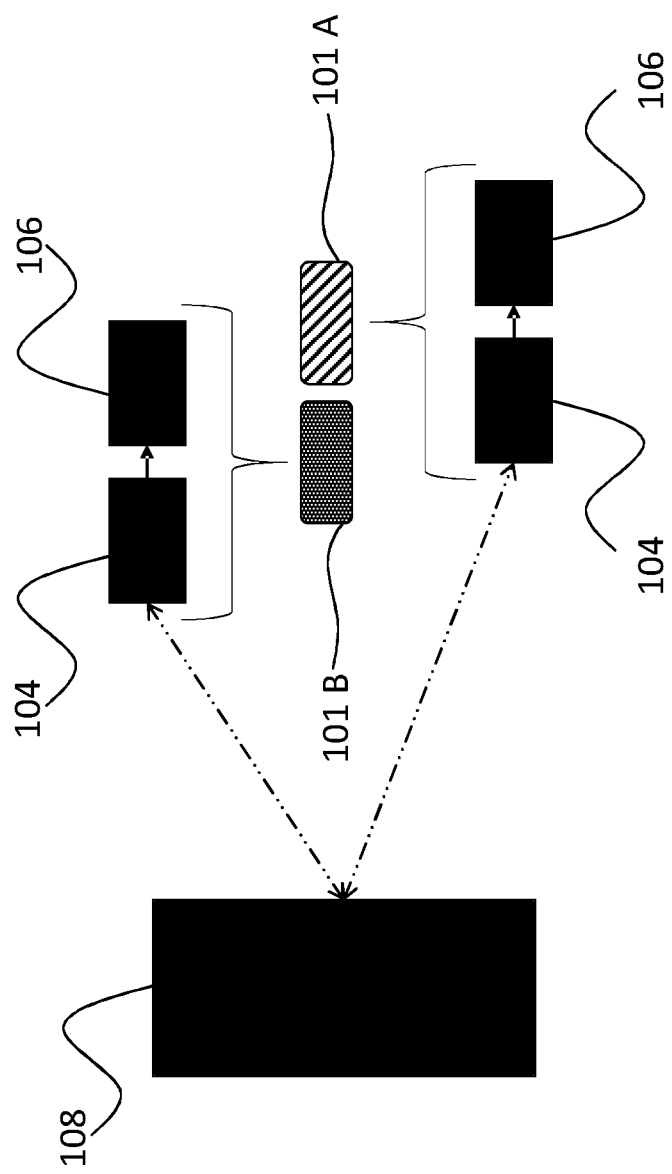
FIG. 1B schematically shows an embodiment where the light emitters comprise a light source driven by electronics.

The light emitters 101A and 101B, as shown in FIG. 1B, comprise electronics 104, such as microcontrollers, that control a light source 106 to define the light signatures identifying the light emitters. Using electronics to define the light signatures makes it possible to change light sources without losing the functionality of the system. Note that, in order to change the spectrum of the light, specific light sources, such as LED's, able to emit different spectra of light are necessary. When light sources which are able to emit different spectra of light are used, the electronics controlling the light sources have to be adapted to control over emitted spectrum.

Figure 3:
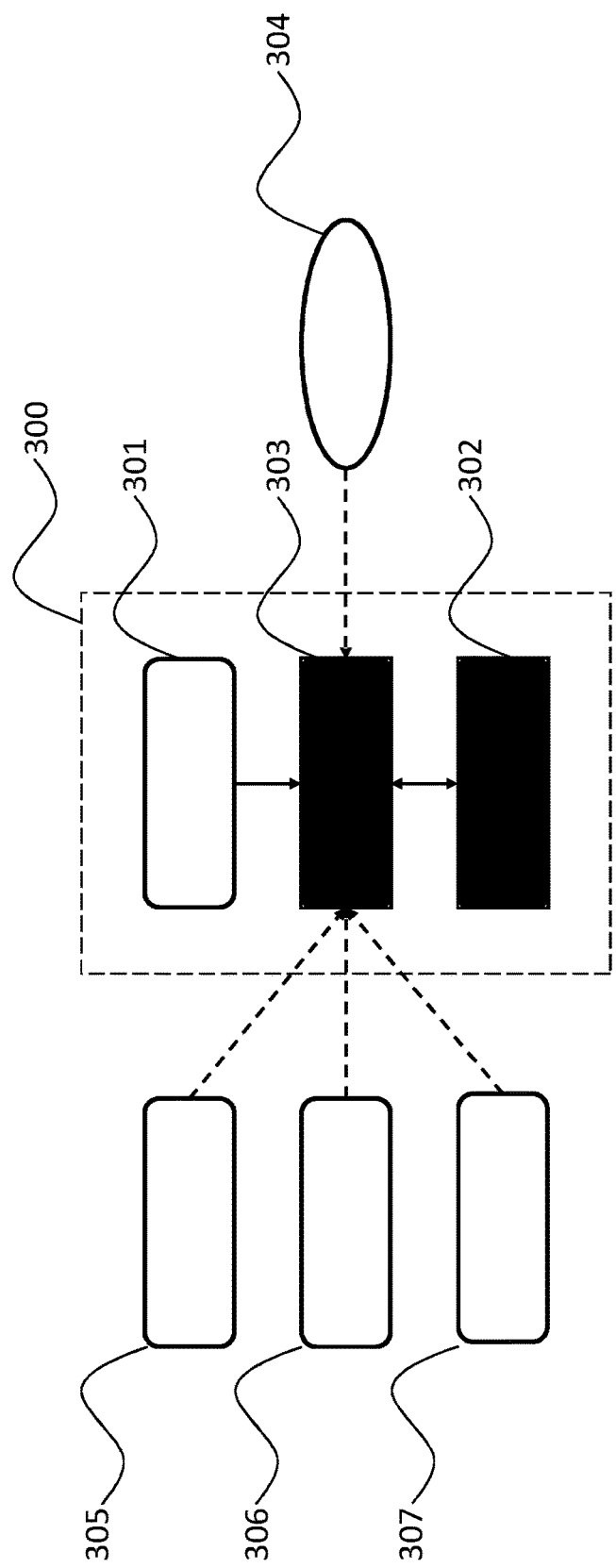
FIG. 3 schematically shows an exemplary embodiment of a portable device according to the invention.
Figure 4:
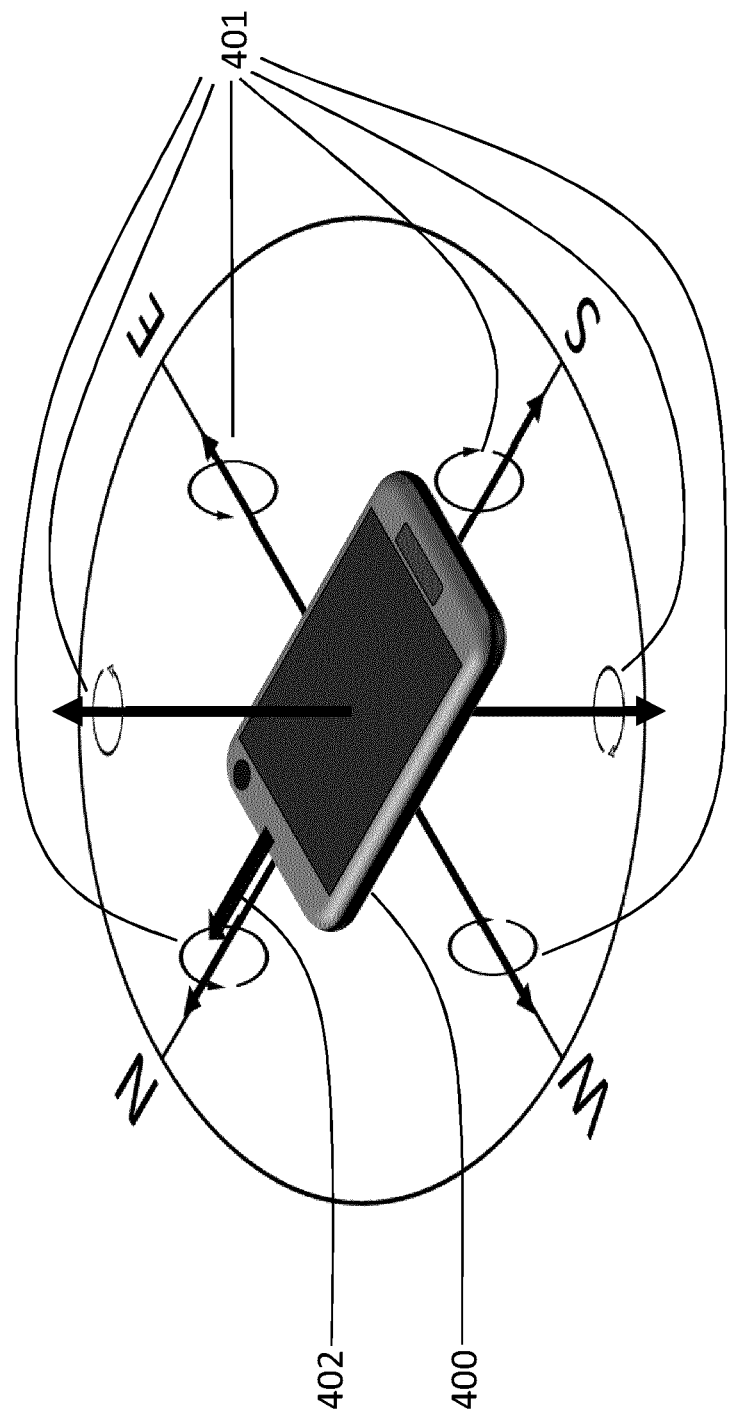
FIG. 4 schematically shows a portable device and illustrates the properties that a magnetic field sensor and a gyroscope can measure.

FIG. 3 schematically represents a portable device 300 comprising a sensor 301 for sensing light, a memory 302 for storing distribution information indicative of the distribution of the light emitted via the optical system and a processor 303 coupled to the light sensor for receiving data on the sensed light and coupled to the memory to get access to the information stored in the memory. The portable device 300 can be implemented as, but is not limited to, a smart phone, a tablet, a laptop, a smart camera, a smart watch and a smart bracelet.

The processor 303 can also be coupled to a network 304 for retrieving information from the network. Various wireless communication technologies that are known in the art may be used to couple the portable device to the network. Examples are Bluetooth, Wi-Fi or ZigBee. Any information that is available in the network can be retrieved. This ability can be used, in a wide variety of situations, to retrieve information necessary or useful for the calculation of the position of the portable device. Using the network to retrieve information can prevent the memory of the portable device to clog.

In order to obtain additional features and or accuracy, the processor 303 can be coupled to an accelerometer 305, a gyroscope 306 or a magnetic field sensor 307 or any combination of the before mentioned sensors. FIG. 2 illustrates the effects of these sensors. The accelerometer can provide the processor with data on the acceleration of the portable device 200. This acceleration can be measured in any direction. The gyroscope can provide the processor with data on the rotation 201 of the portable device and the magnetic field sensor can provide the processor with data on the orientation 202 of the portable device 200. The processor can be configured to use the data from the sensors to increase the accuracy with which the position is determined.

Additionally, the sensor for sensing light 101 can be an image sensor such as a CCD camera which allows the processor to receive additional data that can be used to increase the accuracy with which the position relative to the luminaire is determined.

In order for the processor to determine the ratio from the data received from the sensor for sensing light, it is important that the sensor for sensing light can distinguish between the different light signatures. The light signatures can for example be created by using temporal modulation of the light emitter. Temporal modulation can be used for every spectrum of light and, when the modulation uses a frequency higher than 100 Hz, is typically imperceptible for the human eye. It has been shown that it is possible to distinguish between different signals temporally modulated, incident on the same sensor for sensing light such as shown in patent application US20140280316, US20140314420, US20120170939 and WO2013153476A1.

When the temporal modulation of two different light emitters is done in such a way that the signatures are correlated or coherent with each other, constructive or destructive interference can occur. This can result in indistinguishable light signatures. Therefore, the modulation should be done in such a way that no light signature is a periodic of another signature. This can, for example, be resolved by using prime numbers to determine the frequency of the different light emitters. Additionally, the light signatures can be made more distinguishable by using different spectra for the different light emitters. This could, however, result in a total emitted spectrum that is not pleasant for the human eye or that does not comply with certain rules and regulation.

The control electronics 104 could be coupled, either wired or wirelessly, to a central controller 108 such as a portable device that determines the modulation used and that is able to change the modulation used over time. Another possibility, is that the modulation settings are set in the factory where the system is made. The modulation settings could also be defined during the commissioning process of the system.

Figure 5:
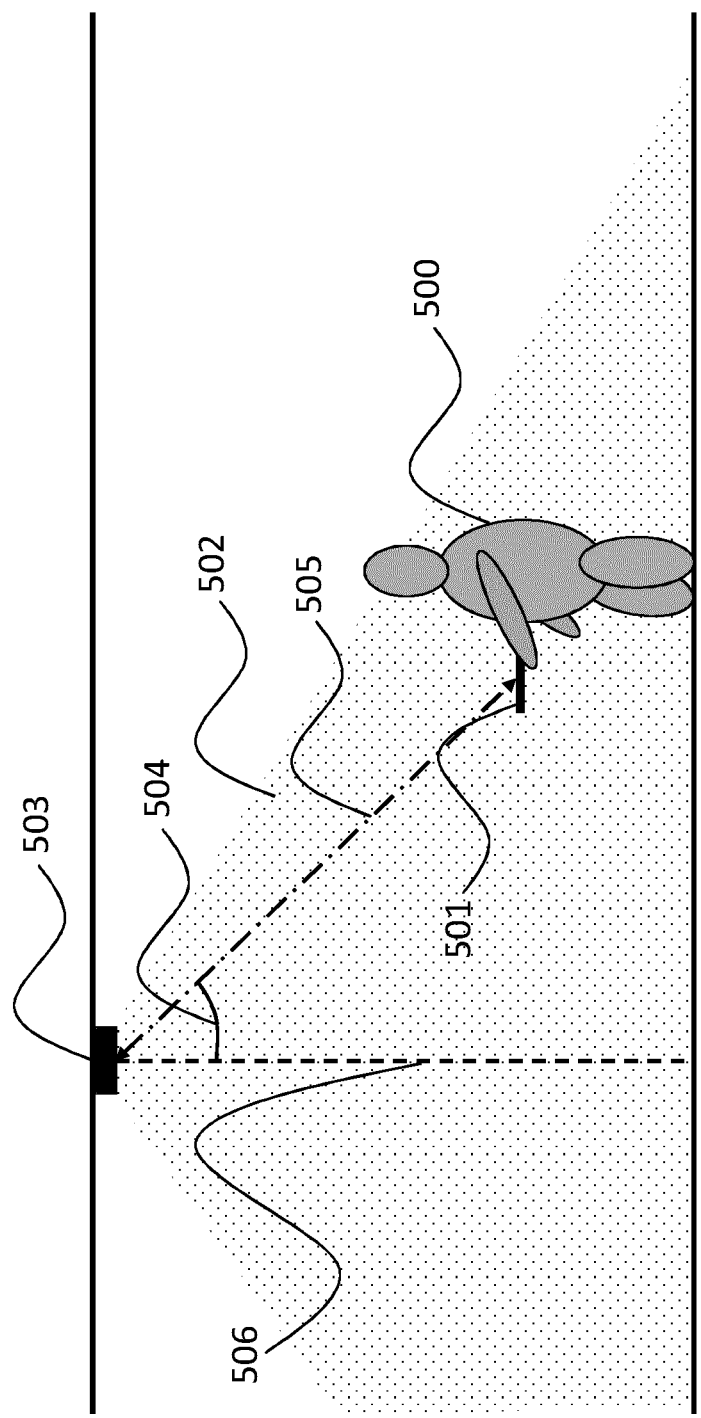
FIG. 5 is a schematic illustration of the position of a portable device relative to a luminaire for a typical use of the system.

FIG. 5 schematically shows an embodiment of the system where a person 500, carries a portable device 501 which uses its sensor for sensing light to sense the light 502 emitted by the light emitters via the optical system 503.

The sensor for sensing light 301 sends the data it collects to a processor 303. In a basic implementation, where there is only one type of luminaire in the space, the relative position to said luminaire can be calculated solely from the data the sensor for sensing light sends to the processor. The sensor for sensing light then at least has the following properties: it is able to measure the illuminance, E (cd·sr·m$^{-2}$), and it is be able to generate data from which the processor can distinguish the luminous intensity for every light signature received.

The processor 303 retrieves the distribution information for the luminaire from the memory 302 of the portable device or from a network 304 to which the processor can be coupled. In this specific case, the distribution information comprises a function that gives the relation between the polar angle, the angle with respect to the normal line of the luminaire 504, and the ratio between the luminous intensity (cd) of different light signatures. Additionally, it comprises information on the luminous intensity of the luminaire, meaning that the power the luminaire radiates is known.

The signatures of the different light emitters are derived from the data on the sensed light that the processor 303 receives from the sensor 301 for sensing light.

An example of an implementation of said derivation is a time sequential implementation. In a time sequential implementation, the modulation of the light emitters is done in a sequential manner meaning that only one light emitter is modulated during a specific time interval. The light can be sensed during a time interval in which all light emitters are subsequently modulated. In this way, it is easy for the processor to distinguish between the different modulations.

The ratio between the luminous intensity from the different light signatures is determined and is combined with the distribution information to determine the angle between the portable device and the normal line of the luminaire. The polar angle 504 can be used to determine the luminous intensity, I (cd), for the luminaire when the luminous intensity is direction dependent.

Figure 6:
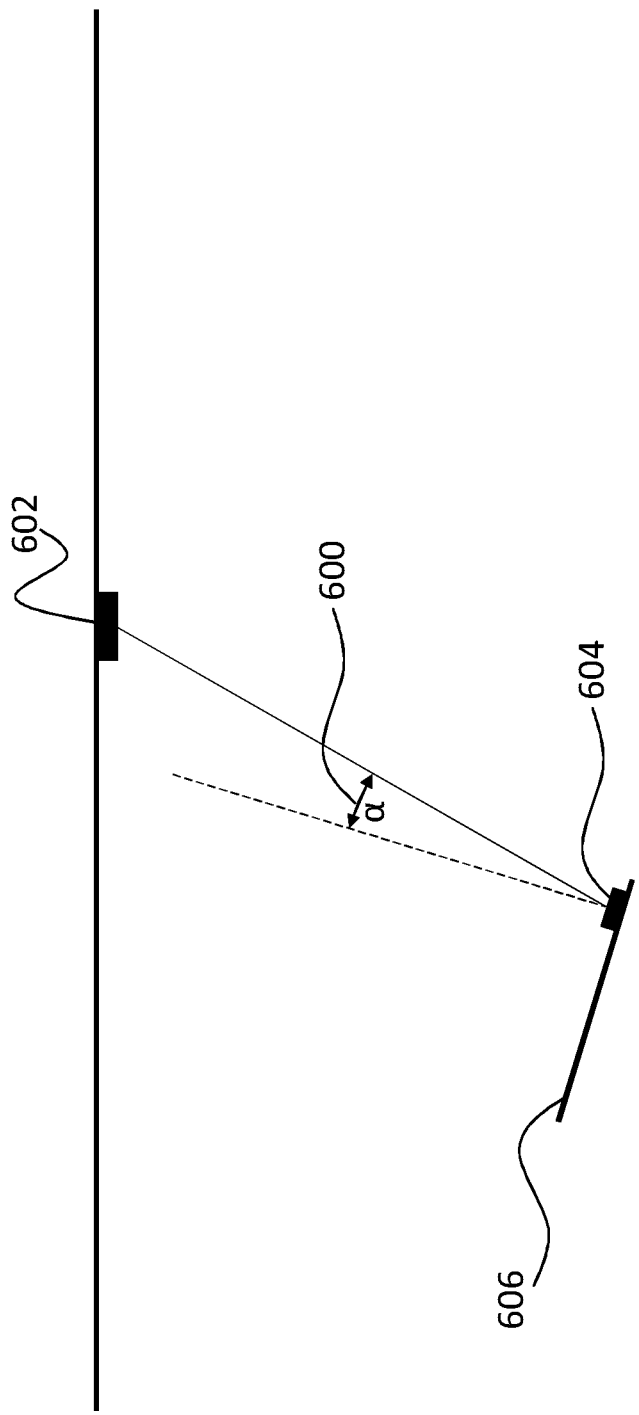
FIG. 6 schematically shows a tilted portable device relative to a luminaire and indicates the angle of incidence.

FIG. 6 shows a situation wherein the portable device 606 is tilted. When the sensor for sensing light is an image sensor the position of the pixels on which a signature is detected can be used to perform an angular correction. This can also be achieved by using the optical characteristics of the image sensor and its appurtenance such as a lens and other optics. The angle of incidence, α, 600 of the light originating from the luminaire 602 on the sensor for sensing light 604 is determined from the position of the luminaire on the image generated by the image sensor.

Now, the distance, d 505, between the sensor for sensing light and the portable device can be calculated using:

$$d = \sqrt{\frac{I \cdot \cos(\alpha)}{E}}.$$

Note that the angular correction implemented as cos(α) increases the accuracy but is not essential. When no information on α is available, an average angle of incidence can be used for example.

Using the distance calculated and the polar angle 504, the position relative to the normal 506 of the luminaire 503 can be determined.

The embodiment discussed above is a basic embodiment. Additional sensors such as the gyromagnetic sensor, the accelerometer and the magnetic field sensor can be added to increase the accuracy. These elements are shown in FIG. 3.

These sensors can for example be used to determine the tilt of the device. This is especially useful when the portable device is close to the luminaire as a tilt can have a significant effect on the field of view of the sensor. When the luminaire comprises three light emitters that have different light signatures, the distribution information also comprises the azimuthal angle 700 shown in FIG. 7 such that the position of the portable device relative to the luminaire can be determined in three dimensions. Now, the luminous intensity I (cd), that is part of the distribution information, is determined for the polar 504 and azimuthal 700 angle. The distance relative to the luminaire can be determined analog to the situation where the luminaire comprises two light emitters, as described above. The position relative to the luminaire can be determined by using the azimuthal angle 700.

The distribution information can be generated by measuring and calibrating the system during commissioning. The distribution information could also be calculated using computer models to describe the luminaire. It is likely that light sources have to be changed by trained installers in order to keep the distribution information constant. It is however also possible that sensors are placed in the space, e.g. during commissioning, where the luminaires are placed to determine the distribution information such that even when the light sources are changed, the distribution information is still up to date. Another possibility is that the luminaires have markings that allow untrained installers to place and orientate the light correctly.

The description of the distribution information above is based only on one embodiment. For this or other embodiments, the distribution information may comprise other or additional information.

Figure 7:
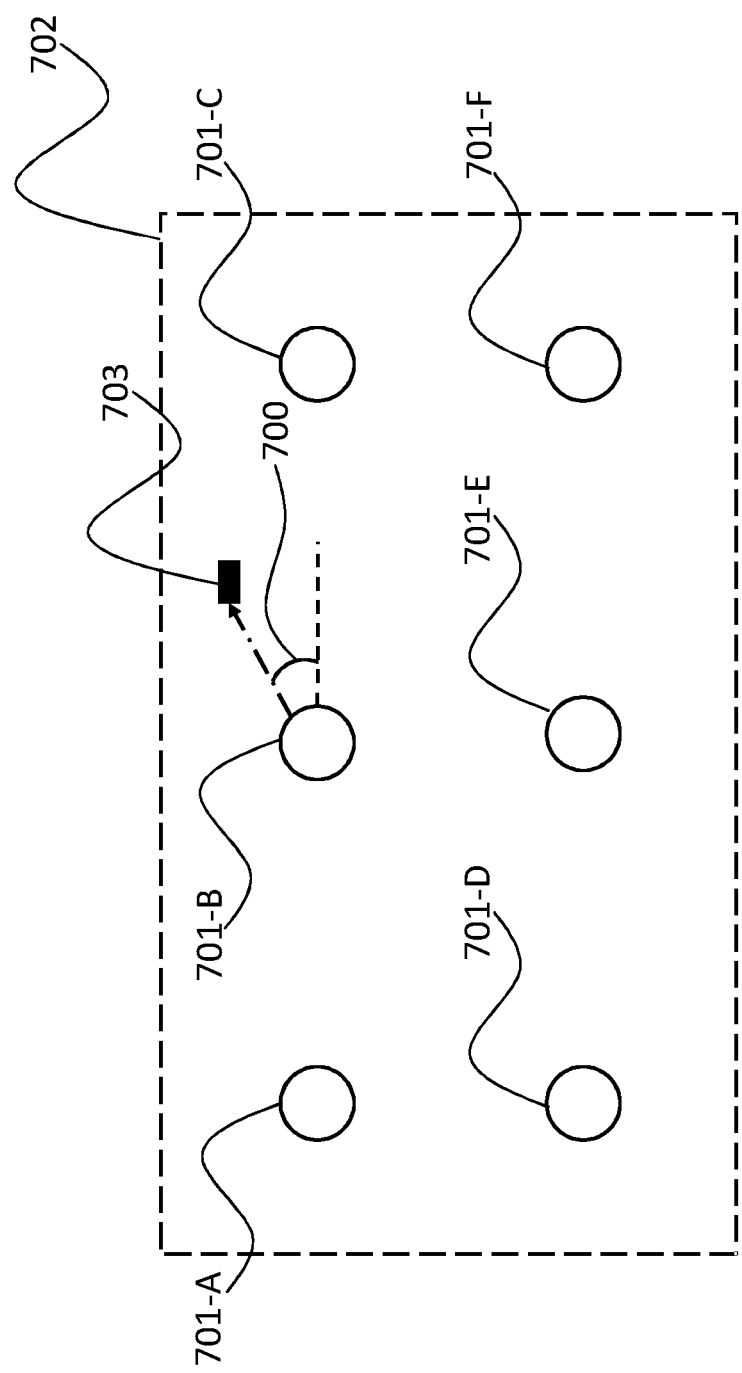
FIG. 7 schematically shows a top view of a portable device situated in a room with multiple luminaires.

As shown in FIG. 7, there can be multiple luminaires 701A-F in a space 702. Note that FIG. 7 is the top view of the space. As the luminaires can have multiple configurations of light emitters, it is practical that a portable device 703 is aware of the configuration of light emitters within the luminaire of which the light the portable device senses originates. When the processor has derived the signatures of the light emitters, it can retrieve information on possible configurations of light emitters within the luminaires from the memory in the portable device or from the network it is connected to. In this way, it can determine the configuration of the light emitters within the luminaire from which the sensed light originates. Subsequently, it can retrieve the distribution information for the type of luminaire from which the sensed light originates from the memory in the portable device or from the network to which the processor may be connected.

For many applications, it is useful to not only know the position of the portable device 503 relative to a luminaire, but to also know the absolute position of a portable device in a space. If the processor retrieves information on the position of the luminaires in a space and the processor has calculated the position of the portable device relative to the luminaire, the position of the portable device in the space can be derived. The information on the position of luminaires in a space can be retrieved from the memory in the portable device or from the network. The latter is likely to be used when the portable device is used in many different spaces such as retail locations or office buildings. In order to obtain information on the absolute position of a portable device in three dimensions, it is necessary that, apart from information on the position of the luminaire, the processer 303 is aware of the orientation of the luminaire. The processor can obtain information on the orientation of the luminaire analog to information on the position of the luminaire.

It is possible that a sensor for sensing light has two luminaires, for example 701B and 701E, in its field of view. As the two luminaires 701B and 701E are separated in position it is likely that the sensor can distinguish between the light originating from both luminaires as the light originating from the different luminaires is incident different areas of the sensor for sensing light. In this case, the processor can determine the relative positions to both luminaires separately by only taking data of one luminaire into account. This enables the processor to increase the accuracy of the position determined by taking both calculated relative in consideration when the absolute position is determined. When the light originating from the different luminaires is incident on the same area of sensor for sensing light, it might be possible to distinguish between different luminaires when they use different modulations of their light emitters. This however complicates the technique and should be avoided by making use of careful commissioning.

It is also possible to use a luminaire comprising two light emitters 100 to determine the position of the portable device relative to the luminaire in three dimensions. Two examples are given.

First, it is possible to use light originating from different light emitters to create a light distribution that is position specific in three dimensions. In this case, however, careful alignment of the portable device with the luminaires is necessary again. Note that this is still an improvement over other indoor positioning techniques as only two luminaires are necessary for accurate positioning in three dimensions.

Second, it possible to use the fact that when two light emitters emit different light signatures shown in FIG. 8 as 800 and 802, there will be an axis of symmetry, x, 804. Perpendicular to axis x, lies axis y, 805. There are two symmetric hemispheres for y>0 and y<0. On both hemispheres, one can obtain the azimuthal angle 700 from the distribution information. In order to obtain unambiguous information on the relative position of the portable device, it is necessary to know in which hemisphere the portable device resides. In order to do this, one measures the illuminance, the time and the angle of incidence α at a first point, 806 or 810. From this information, the polar angle 504 can be determined for point 1.

Then, the portable device should be moved to a second point, point 2 808 or 812, where the ratio between the luminous intensity of the different light signatures differs from point 1. The illuminance, time and angle of incidence α are registered anew. During the movement, the gyroscope, linear accelerometer and magnetic field sensor gather data.

Using this data, the movement of the portable device is determined. The movement of the portable device comprises the distance travelled as well as the angular distance travelled. Using the measured ratios at point 1 and 2 and the distribution information, the portable device can determine the expected angular distance between point 1 and point 2. Now, the portable device can determine in which direction it has rotated from the movement of the portable device. This is used to determine if the portable device is in the upper (y>0) hemisphere or in the lower (y<0) hemisphere as the direction of rotation necessary to go from point 1 to point 2 is opposite for both hemispheres. It can be detected if the portable device has crossed the axis of symmetry by comparing the expected angular distance between point 1 and point 2 and the travelled angular distance. Now that it is clear in which hemisphere the portable device resides, the relative position in three dimensions can be determined by using the polar and azimuthal angle and calculating the distance to the luminaire as described above. The relative position determined can be used as a reference point for the sensors in the portable device such that new relative positions can be determined by determining the movement of the portable device using sensors. The portable device should calculate a new reference point when a new luminaire is detected or after a specified measure of time has passed or after the portable device has travelled a specified distance.

The term "space" includes a variety of indoor and outdoor spaces such that the possibility exists that the luminaires are not the only light sources in the space. Therefore, it may be useful to control the sensor to determine a spectrum for which the sensor senses the light. In the situation where there is an abundance of daylight for example, the sensor for sensing light may be saturated, such that the signatures from the luminaires are not visible anymore. By adjusting the spectrum that the sensor for sensing light senses to blue, a large part of the daylight is filtered out resulting in visible light signatures originating from the light emitters via the optical system. This feature is not limited to use in rooms with an abundance of daylight. It can also be used in combination with the control over the spectra the light emitters emit to increase the visibility of the light signatures in rooms with an abundance of light originating from other luminaires. When these luminaires, for example, emit light in a specific spectrum, the light emitters that emit the modulated light signatures can be configured to emit another spectrum and the sensor for sensing light can be configured to only sense the latter spectrum.

The term "light source" should be understood to refer to any one or more of a variety of radiation sources, including, but not limited to, LED-based sources (including one or more LEDs as defined below), fluorescent sources, phosphorescent sources, high-intensity discharge sources (e.g., sodium vapor, mercury vapor, and metal halide lamps), lasers, other types of electroluminescent sources, pyro-luminescent sources, luminescent polymers, capable of emitting a light source unique signature such as, but not limited to, spectral and temporal signatures.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination.

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

The term "luminaire" is used herein to refer to an implementation or arrangement of one or more light emitters in a particular form factor, assembly, or package. The term "light emitter" is used herein to refer to an apparatus including one or more light sources of same or different types. A given light emitter may have any one of a variety of mounting arrangements for the light source(s), enclosure/housing arrangements and shapes, and/or electrical and mechanical connection configurations. Additionally, a given light emitter optionally may be associated with (e.g., include, be coupled to and/or packaged together with) various other components (e.g., control circuitry) relating to the operation of the light source(s).

In various implementations, a processor may be associated with one or more storage media (generically referred to herein as "memory," e.g., volatile and non-volatile computer memory such as RAM, PROM, EPROM, and EEPROM, floppy disks, compact disks, optical disks, magnetic tape, USB sticks, SD cards and Solid State Drives etc.). In some implementations, the storage media may be encoded with one or more programs that, when executed on one or more processors, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols.

Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The invention claimed is:

1. A system for determining a position of a portable device relative to a luminaire, comprising:
    at least one luminaire, said luminaire comprising at least two light emitters for emitting light, the light comprising a first light signature and a second light signature, wherein the first light signature and second light signature identify the light emitter from which the light originates, and wherein the first light signature and the second light signature are different;
    an optical system for guiding the emitted light to create a distribution of the light emitted by the at least two light emitters via the optical system, wherein a ratio between light signatures originating from the at least two light emitters within the distribution of light is unique for every position in a two-dimensional space;
    and a portable device comprising:
    a sensor for sensing light;
    a memory for storing distribution information indicative of the distribution of the light emitted via the optical system; and
    a processor coupled to the light sensor for receiving data on the sensed light and coupled to the memory to get access to the information stored in the memory, said processor is arranged to derive the light signatures from the received data on the sensed light; determine contribution information indicative for contributions of light with the derived signatures to the light sensed and determine a position of the portable device relative to the luminaire on the basis of contribution information and the distribution information.

2. The system of claim 1 wherein the portable device further comprises a module for connecting the processor to a network to retrieve information from the network.

3. The system of claim 1, wherein the sensor for sensing light is an image sensor and wherein the portable device further comprises at least one sensor of a group comprising an accelerometer providing data on acceleration of the portable device, a gyroscope for providing data on the rotation of the portable device and a magnetic field sensor providing data on the orientation of the portable device, wherein the processor is coupled to the at least one sensor for receiving data provided by the at least one sensor and wherein the processor is configured to use the data received in combination with the contribution information and the distribution information to determine the position of the portable device relative to the luminaire.

4. The system of claim 1, wherein the processor is arranged to retrieve information on a position of the luminaire in a space and the processor is configured to use this information to determine the position of the portable device in the space.

5. The system of claim 1, wherein the system comprises multiple luminaires in the space having multiple possible configurations of light emitters, wherein the processor is arranged to retrieve information on the possible configurations of light emitters within the luminaires, wherein the processor is configured to use the contribution information and the information on possible configurations of light emitters within the luminaires to determine the configuration of the light emitters within the luminaire from which the sensed light originates and wherein the processor is configured to retrieve the distribution information of the light emitted by a luminaire with the determined configuration.

6. The system of claim 1, wherein the luminaire comprises more than two light emitters.

7. The system of claim 1, wherein the processor controls the sensor to determine a spectrum for which the sensor senses the light.

8. A luminaire comprising:
    at least two light emitters for emitting light, the light comprising a first light signature and a second light signature, wherein the first light signature and the second light signature are different, and wherein the first light signature and the second light signature identify the light emitter from which the light originates and the light being emitted towards an optical system arranged to guide the emitted light to create a distribution of the light emitted by the at least two light emitters via the optical system; wherein a ratio between light signatures originating from the at least two light emitters within the distribution of light is unique for every position in a two-dimensional space.

9. The luminaire of claim 8 wherein the light emitters comprise electronics that control a light source to define the light signatures identifying the light emitters.

10. The luminaire of claim 9 wherein the electronics control the light source to create a temporal modulation and wherein the control is configured to prevent interference effects between light signatures originating from different light emitters.

11. The luminaire of claim 9 wherein the electronics control the spectral properties of the light sources.

12. The luminaire of claim 8 wherein the optical system is arranged to mix the light signatures emitted by the at least two light emitters.

13. A method of determining a position of a portable device relative to a luminaire, which luminaire comprises at least two light emitters for emitting light, the light comprising a first light signature and a second light signature, wherein the first light signature and the second light signature are different, and wherein the first light signature and the second light signature identify the light emitter from which the light originates and the light being emitted towards an optical system for guiding the emitted light to create a distribution of the light emitted by the at least two light emitters via the optical system, which light is sensed by a sensor for sensing light within the portable device and wherein a ratio between light signatures originating from the at least two light emitters within distribution of light is unique for every position in a two-dimensional space; the method comprising:
   receiving data on the sensed light;
   receiving distribution information indicative of the distribution of the light emitted via the optical system;
   deriving the light signatures from the received data on the sensed light; and
   determining contribution information indicative of contributions of light with the derived signatures to the light sensed; and
   determining a position of the portable device relative to the luminaire on the basis of contribution information and the distribution information.

14. The method of claim 13, wherein the sensor for sensing light is an image sensor and wherein the portable device further comprises at least one sensor of a group comprising an accelerometer providing data on acceleration of the portable device, a gyroscope for providing data on the rotation of the portable device and a magnetic field sensor providing data on the orientation of the portable device, the method further comprising:
   receiving data provided by the at least one sensor; and
   combining this data with the contribution information and the distribution information; and determining the position of the portable device relative to the luminaire on the basis of the combination of the received data, the contribution information and the distribution information.

* * * * *